United States Patent [19]

Salomon

[11] 4,120,064
[45] Oct. 17, 1978

[54] METHOD FOR ADJUSTING A SKI-BOOT TO A SKIER'S FOOT

[75] Inventor: Georges Pierre Joseph Salomon, Annecy, France

[73] Assignee: Establiessements Francois Salomon et Fils, Annecy, Haute-Savoie, France

[21] Appl. No.: 622,688

[22] Filed: Oct. 15, 1975

[30] Foreign Application Priority Data

Oct. 15, 1974 [FR] France .................. 74 34643
Oct. 8, 1975 [FR] France .................. 75 30799

[51] Int. Cl.² .................. A43D 9/00; A43B 7/14
[52] U.S. Cl. .................. 12/142 R; 36/93
[58] Field of Search .......... 12/142 R, 142 P; 36/93, 36/71, 117, 88; 264/222, 223, 46.5, 46.6; 2/413, 414

[56] References Cited

U.S. PATENT DOCUMENTS

| | | | |
|---|---|---|---|
| 3,750,310 | 8/1973 | Messner et al. | 36/93 |
| 3,882,546 | 5/1975 | Morton | 2/413 |
| 3,896,202 | 7/1975 | Palau | 36/93 |
| 3,905,376 | 9/1975 | Johnson et al. | 264/222 |
| 3,925,277 | 12/1975 | Lampe | 264/222 |
| 3,992,721 | 11/1976 | Morton | 2/414 |
| 3,995,002 | 11/1976 | Brown | 12/142 R X |

FOREIGN PATENT DOCUMENTS 2,106,667  4/1972  Fed. Rep. of Germany ........ 36/93

*Primary Examiner*—Patrick D. Lawson
*Attorney, Agent, or Firm*—Pollock, Vande Sande & Priddy

[57] ABSTRACT

A ski boot comprising an external shell and a rigid sole, a slipper producing at least one cavity between the shell and the foot. The method of adjustment consists in filling the cavity with a moldable mixture of products kept in a viscous or paste-like state by means of at least one volatile product, and then eliminating at least one of the volatile products by causing it to pass into a gaseous phase until the mixture of products hardens. The invention has the particular advantage of making it possible to adjust the ski boot to a skier's foot without risk of compressing it in a dangerous manner.

26 Claims, 1 Drawing Figure

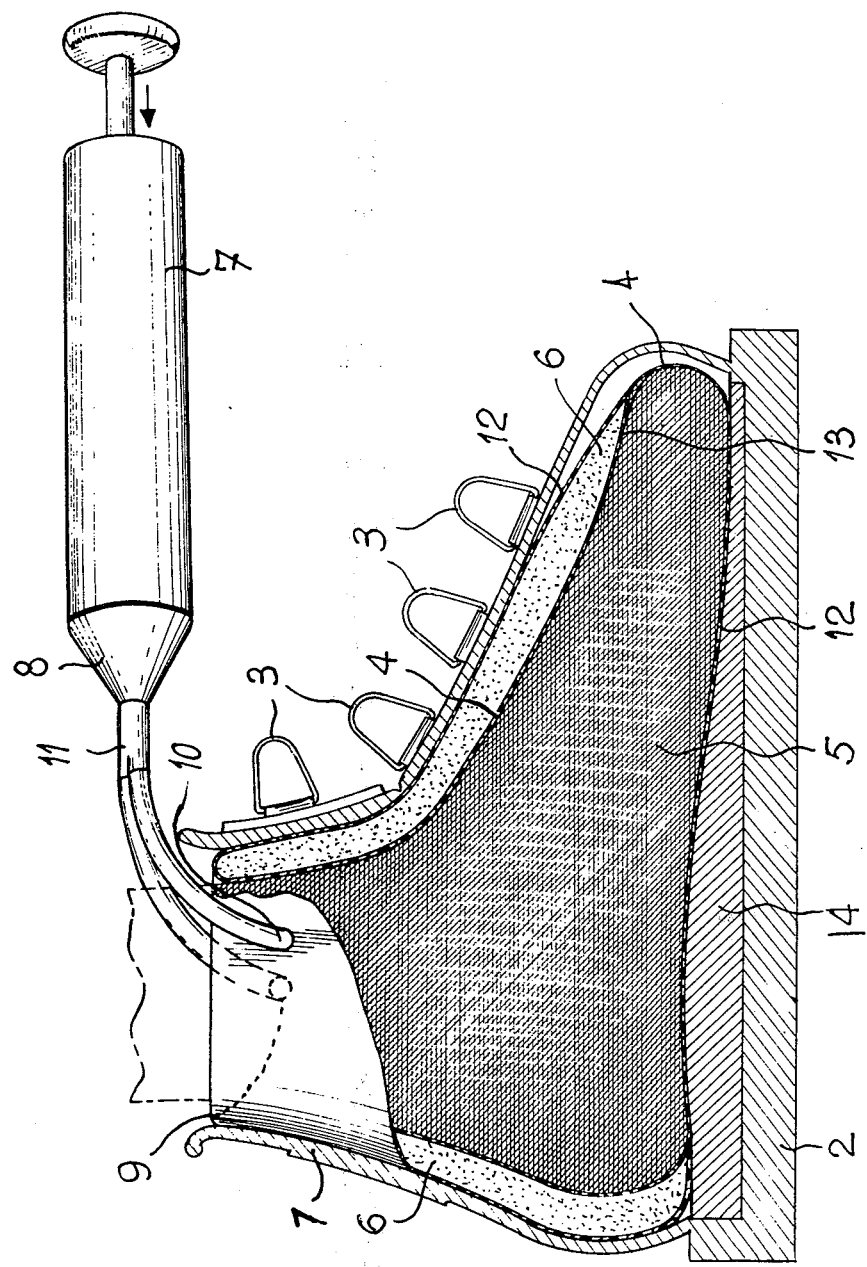

METHOD FOR ADJUSTING A SKI-BOOT TO A SKIER'S FOOT

The present invention relates to a new method for adjusting the internal volume of a ski boot to the configuration of a skier's foot; it also relates to a boot adjusted according to such method.

Known ski boots consist of (1) a sole, more particularly a rigid sole, produced by polyurethane injection, the shell being arranged to open for inserting and removing the foot, and being generally closed by means of a variable number of hooks, and (2) an internal slipper which may or may not be removable.

For the purpose of fitting the slipper to the shape of the skier's foot, and to the internal shape of the shell, it is known to fill the cavities in the slipper, between the shell and the foot, with an adjusting material, the material most commonly used being one which hardens by polymerization but is resiliently deformable, for instance an injected polyurethane foam or a soft, deformable material, such as a highly viscous product, for instance a modelling compound, a specific amount of which is positioned at the time of manufacture.

These two methods of fitting the slipper to the dimensions of the user's foot and of the rigid shell have certain disadvantages.

The first method, which is described in Swiss Pat. No. 506,260, has the disadvantage of making it necessary to handle dangerous products such as isocyanates. Furthermore, when an expandable material is used, it is essential to determine accurately the amount of material to be introduced in order to fill the free space between the shell and the slipper and, at the same time, avoid dangerously compressing the skier's foot at the time of expansion. Finally, the chemical reactions occurring during the hardening of the injected material release heat, and there may be a danger or overheating the skier's foot unduly in the course of the fitting operation, during which the foot must remain stationary.

The second method, which, it will be recalled, uses a product which remains permanently viscous, has been described in U.S. Pat. No. 3,402,411. This has a totally different kind of disadvantage, namely that, under certain conditions, especially while the boot is being dried after skiing, it is impossible to prevent the viscous product from decending by its own weight to the bottom of the slipper. Furthermore, the amount of self-molding product cannot be adjusted in relation to the volume of the foot.

In order to overcome these problems, it has been proposed to use a fluid, thermoplastic adjusting material, i.e., a material which hardens upon cooling. A method of this kind is described in French Pat. No. 2,166,903, but clearly a method of this kind does not solve the problem, since in order to keep the plastic material in a liquid state while to cavity between the foot and the boot is being filled, the material must be heated, preferably to a temperature between 50° and 80° C., the fusion point of the thermoplastic material used. This presents the risk of burning the skier's foot.

It is the purpose of the present invention to overcome these disadvantages, namely to avoid:
 having to handle toxic products;
 compressing the skier's foot to a dangerous degree by the use of an excess of expanded foam material;
 burning the skier's foot,
while still making it possible to fit the ski boot quickly, simply, and accurately to the skier's foot.

According to an essential characteristic of the invention, this result may be achieved by means of a method consisting in:

placing the foot to be fitted, or a model thereof, inside the slipper, at least one cavity of which is filled with a moldable mixture consisting of products kept in a liquid, viscous, or paste-like state by means of a volatile product, and then eliminating at least one of the volatile products by causing it to pass into a gaseous phase until the mixture products hardens.

According to an initial aspect of the invention, this mixture of viscous adjustment products consists of:

a binder comprising at least one of the following products: an elastomeric product, a plastic product, a mixture of these two types of products, or a mixture of a plurality of products of the same type;

a filler; and a volatile product.

The elastomeric product may be any elastomer capable of being placed in solution, suspension, or emulsion, e.g., natural rubber, reticulated or not, a butyl, nitrile, or chlorinated rubber, a polyisobutylene, an ethylene/propylene rubber, a styrene-butadiene or styrene-isoprene copolymer, a latex, a polyurethane, a silicone, an isobutylene/isopropylene copolymer, or a thiokol.

The plastic product may be any type of plastic capable of being placed in solution, suspension, or emulsion in conventional solvents, e.g., a polyamide, a polyurethane, an acrylic, a cellulosic, a glycerophthalic, epoxy or vinylic product.

The filler may be mineral or synthetic vegetable or organic material. The preferred grain size is between 0.1 and 30 mm.

The filler may be resiliently compressible, in which case it consists preferably or scrap polyurethane foam, rubber powder, polyethylene foam or cork powder. On the other hand, the filler may be incompressible, in which case it consists preferably of wood dust, carbonate of lime, slate powder or polystyrene balls. The filler may, of course, be a mixture of different products.

The preferred volatile product may be a solvent made of plastic and/or elastomeric materials, more particularly an aliphatic, aromatic, halogenated, ketonic product, with an ether, ester or alcohol function. It may have a plurality of functions and may have a straight, branched or cyclic chain. It must not, however, attack or dissolve the walls of the cavity. It is conceivable to use a mixture of solvents in order to lower the boiling point by means of an azeotrope. The solvent selected will have a boiling point of less than 150° C., preferably less than 80° C. (at normal pressure). The vapor tension should also be such as to allow easy evaporation.

A mixture of solvents may also be used for the purpose of preventing the retention of an unduly volatile solvent within the compound, the less volatile solvent preventing the rapid formation of a sort of impermeable crust on the surface of the mixture.

According to another aspect of the invention, the moldable mixture introduced into the cavity contains polystyrene, or a polystyrene copolymer, placed in solution in a solvent or a mixture of solvents, capable of passing into a gaseous phase under close-to-normal pressure and/or temperature conditions, i.e., at atmospheric pressure (760 mm Hg) and at an ambient temperature of about 20°–25° C.

It is known to be very difficult to dissolve polystyrene industrially in a gaseous solvent under normal conditions. The applicant, however, has developed a method which makes it possible to obtain, reproducibly, polystyrene or polystyrene copolymer solutions under satisfactory economic conditions. This method was the object of a French Pat. No. 2,326,441, entitled "Method for obtaining a polystyrene foam and novel industrial products."

As disclosed in this patent application, it is possible to place polystyrene, of a polystyrene copolymer, in solution in a solvent, or mixture of solvents, having a gaseous phase under pressure and/or temperature conditions close to normal. As described in the said patent, if the initial material is a polystyrene, or certain polystyrene copolymers, they will be used in the pre-expanded form in order to facilitate their solution.

The pre-expanded polystyrene may be a commercial polystyrene or a non-expanded polystyrene which will be subjected to pre-expansion, for example by circulating water vapor onto the base product.

This pre-expansion produces a considerable increase in the area of contact between the product and the solvent added subsequently thereto. This greatly facilitates the dissolving process, in fact, it may be made instantaneous by using quantities of solvent which are large in relation to the quantity of pre-expanded polystyrene.

In the case of a polystyrene-butadiene copolymer, however, the material may be dissolved in the form of a powder, without passing through the pre-expansion phase.

Here again, of course, the type of solvent is important and, within the scope of the present invention, in which it is desired to avoid exposing the skier's foot to distressing temperatures, use will be made of a solvent, or a mixture of solvents, having a vapor tension above 1 kg/cm$^2$ at 20° C. As indicated in the above identified French patent the preferred solvent will be a chlorofluorinated hydrocarbon, more particularly dichlorofluoromethane or trichlorofluoromethane.

For the purpose of achieving more uniform expansion of the product, a surfactant, preferably a silicone oil, will be added to the mixture of polystyrene and solvent.

It is desirable to store the mixture ready for use in a container which is pressure-tight and allows the mixture to be discharged under pressure. This container may be of the "aerosol" type.

In this case, according to another aspect of the present invention, the adjustment process consists in:
placing the foot, or a model of the foot, inside the boot;
injecting into the cavity, preferably by means of an aerosol container, a solution containing at least polystyrene and a solvent maintained in the container at a pressure above atmospheric pressure, and allowing the solvent to escape from the cavity in the form of a gas, until the product hardens into a polystyrene foam.

According to one preferred form of execution, the mixture injected into the cavity has the following composition:
50 parts by weight of pre-expanded polystyrene;
100 parts by weight of dichlorofluoromethane; 2 parts of surfactant, preferably silicone oil.

These proportions provide a product with satisfactory filling properties.

It should be noted that evaporation of the solvent may be accelerated by heating the boot to a temperature between 40° and 80° C. and/or subjecting it it lower-than-atmospheric pressure.

In order to achieve these particular pressure and temperature conditions, the boot will, of course, be placed in an enclosed area.

It should be noted that the boot never reaches this high temperature, the heat applied being intended merely to absorb the cold created by the departing solvent.

According to another characteristic of the invention, elimination of the volatile product is facilitated by the application of heat and/or a vacuum, in that the boots adjusted to the skier's feet are placed in a thermostatically controlled enclosure equipped with pumping means sufficient to maintain a partial vacuum.

According to still another characteristic of the invention, elimination of the volatile product is facilitated by injecting the mixture of adjusting products, under pressure, into the cavity between the foot and the shell. The effect of this pressure is to assist in keeping the solvent in a liquid state, especially in the case of freon. Thus, when the cavity is placed in communication with the outside, the solvent escapes very quickly by boiling.

According to still another characteristic of the method according to the invention, the mixture of adjusting products is injected into a cavity located betwen the foot and the shell and defined by a porous envelope. This facilitates the eventual escape of the solvent. This variant of the method according to the invention is intended for use by the retail merchant who fits the boot to the skier's foot. In this case, the retailer must have in his store:

boots and slippers equipped with cavities;
a container for the mixture of adjusting products in a liquid, viscous, or paste-like state, and injection equipment. The latter may consist of a syringe (of the type used for mastic materials) or an aerosol container which also acts as the receptacle for the adjusting products.

According to still another characteristic of the invention, the mixture of adjusting products in a sealed envelope is placed in the boot during manufacture; this envelope is then opened, in one place at least, to allow volatile product to escape. With this variant, the retail merchant is no longer required to handle the adjusting products, since they are already in place in the boot.

The invention also relates to ski boots adapted to the skier's feet by one of the variants of the method described above. Ski boots thus adjusted to the skier's feet are characterized in that the adjustment materials they contain are capable of containing traces of at least one volatile material. Thus, if the mixture used has a polystyrene or a polystryene-copolymer base, the final foam may contain traces of a chlorofluorinated hydrocarbon, more particularly dichlorofluoromethane or trichlorofluoromethane.

The invention also relates to ski boots specially designed to permit the use of the method according to the invention, the boots being characterized, more particularly, in that the cavities arranged in the slipper, or between the shell and the slipper, are filled with a mixture of adjusting materials contained in a sealed envelope. It will be recalled that this envelope is intended to be opened, in one place at least, at the time of use, in order to allow the volatile product to escape. The adjustment materials may be any one of the mixtures of products described above.

Other designs of boots, specially intended to permit the use of the method according to the invention, are characterized in that the cavities arranged in the slipper, or between the shell and the slipper, are defined by a porous envelope.

In conjunction with the following non-restrictive examples, a description will now be given of particular variants of the method according to the invention.

EXAMPLE 1

The single drawing FIGURE shows a section through a ski boot consisting of (1) a shell 1 and a rigid sole 2 produced by polyurethane injection, the shell being opened to introduce the foot and being closed by means of hooks 3; and (2) of a removable internal slipper 4 which the user may withdraw. This slipper produces cavities 6 between the shell and the skier's foot 5, and consists of an outer envelope of split hide 12 and an inner envelope of expandable polyamide tricot covered with a layer of foam rubber. These two envelopes are joined together at the front end of the foot and under the foot, in order to prevent the toes being molded with the product, or the foot being lifted, when the product is injected. They are also joined together on a level with the top of the boot upper, thus constituting a double envelope adapted to provide a cavity between the skier's foot and the shell of the boot. Where these envelopes are joined together under the foot, it is desirable to use a plantar arch 14 fitted into the shell.

The procedure for adjusting a boot of this kind to the skier's foot is as follows: After the hooks have been fastened, a mixture of the following composition is injected, by means of a syringe for mastic products, into the cavities in the slipper located inside the boot:
- 143 parts by weight of polyisobutylene, as the elastomeric binder;
- 743 parts by weight of hexane, as the volatile product, in this case a solvent for the binder;
- 114 parts by weight of cork granules, the average grain size of which is 2 mm, as the filler.

The amount of solvent used is such that the mixture is sufficiently fluid to disperse easily into the entire cavity between the foot and the shell. The mixture, which is in a sealed cartridge 7, is injected with a syringe for mastic products 8, through two apertures 9 and 10 located in front of and behind the leg above the ankle, the apertures being connected to the syringe by a Y-piece 11. As soon as there is enough pressure in the slipper, the injection is halted and the two product inlets are plugged. The skier may then take his foot out of the boot, since the viscosity of the mixture is such, or has now become such, that it can no longer flow under its own weight before it hardens completely. Complete elimination of the solvent is then carried out in the open, but this operation may also be speeded up by using a thermostatically controlled stove.

This produces a slippper properly adjusted to the volume of the skier's foot.

EXAMPLE 2

The shell used in this variant is identical with the shell in Example 1, but the internal slipper consists of a padding of resiliently deformable foam, possibly enclosed between two envelopes. This slipper is manufactured separately and has a cavity or a reduction in thickness at the instep.

At the location of this cavity, and between the outer wall of the slipper and the shell, a sealed envelope is introduced, into which is injected a mixture of the following composition:
- 20% of acrylonitrile - butadiene - styrene, as the binder;
- 60% of dichloromethane, as the solvent;
- 20% of wood dust, as the filler.

A boot of this kind is adapted to the skier's foot by:

placing the skier's foot in the boot and the mixture, in a viscous state, in the sealed envelope, so that the whole of the cavity available between the skier's foot and the shell is filled, with the foot at the bottom of the boot; and placing the sealed envelope in communication with the outside, more particularly by piercing it, so that the solvent may escape and the adjusting product may harden.

As a possible variant, the mixture may be placed in the sealed envelope in the factory, in which case it is desirable to have sealed envelopes of different thicknesses, or to allow some of the mixture to escape through a valve, before the envelope is pierced to allow the mixture to harden.

Obviously care must be taken in placing the sealed envelope in communication with the outside, i.e., only the solvent must be allowed to escape. The pores created in the walls of the sealed envelope (or the pores originally existing in the walls of the cavity) should act as a filter.

EXAMPLE 3

The method according to the invention also allows for injection of a spontaneous-molding compound, i.e., for injecting the correct volume of the mixture between the foot and the shell. In this case, the spontaneous-molding compound, the viscosity of which is such as to make it impossible merely to inject it, is placed, according to the invention, in solution, suspension, or emulsion in a volatile product which is subsequently eliminated in order to restore the initial viscosity.
- 73.2% by weight of a mixture of two polyisobutylenes having molecular-mass numbers equal to 820 and 8,000;
- 18.3% by weight of cork powder, and
- 8.5% by weight of hexane, as the volatile product, are injected under the conditions described in Example 1. Evaporation of the solvent makes it possible to obtain a spontaneous-molding compound of the desired viscosity. The change in volume produced by the elimination of this small amount of solvent is negligeible.

EXAMPLE 4

A mixture of the following composition is made up ahead of time in a pressure-tight container, of the aerosol type:
- 50 parts by weight of pre-expanded polystyrene;
- 100 parts by weight of dichlorofluoromethane;
- 2 parts by weight of silicone oil.

Since the mixture is stored under pressure, the solution is in the liquid state.

The pressure obtained in the container is enough to fill the cavity between the shell and the slipper. The pressure in the slipper may be adjusted by means of a pressure gauge, in order to avoid applying too much pressure to the skier's foot.

In this case, the mixture is injected into the boot through a single hole located at the instep, for example.

As a possible variant, the injection may be effected through a first aperture located, e.g., at the instep, a second aperture, serving as a vent, being located, e.g., in the heel area, by means of which the pressure on the foot may be adjusted.

In order to activate the expansion of the product, the boot (containing the skier's foot or a model thereof) may be placed under an infra-red lamp or in an enclosure in which the internal temperature is between 40° and 80° C.

It should be noted that an enclosure of this kind might also be set to a pressure below atmospheric pressure, in which case the temperature required would be relatively low.

A period of between 10 and 15 minutes is required for expansion and solidification, after which the polystyrene foam will have solidified sufficiently to allow the skier to remove his foot.

As a possible variant, the pressure at which the mixture is applied to the bottom may be produced by any other appropriate device, more particularly a compressor. In this case there will be no need for an aerosol container.

It should be noted that the mixture may be injected into:
a porous slipper, or
between the skier's foot (which will be insulated from the mixture by any suitable means) and the shell, especially if the foam is flexible, or
between a flexible foam slipper, placed on the foot, and the shell, in order to fill up any remaining voids.

A more flexible foam may be obtained by adding a plasticizer, for example a polyisobutylene, to the polystyrene or polystyrene copolymer solution.

Finally, although a solvent is used in this example, it is quite obvious that, without departing from the scope of the invention, it would be possible to use a mixture of several chlorofluorinated solvents, or a mixture of one or more chlorofluoroinated solvents with at least another organic solvent, in order to take advantage of an azeotrope, for example, or more simply of an entrainment phenomenon. The other solvent could serve to increase the solubility of the polymer.

Furthermore, it should be noted that the mixture in the container could be of a composition different from that indicated above. For instance, instead of using polystyrene only, it would be possible to use either polystyrene copolymers or mixtures of polystyrene and polystyrene copolymers.

Two other examples of compounds based on copolymers are given below.

EXAMPLE 5

100 parts by weight of acrylonitrile-butandienesytrene, in the form of a powder, are placed in an aerosol container, and 300 parts by weight of dichlorofluoromethane are added thereto.

After injection and evaporation of the solvent, the foam obtained is less brittle than when pure polystyrene is used.

EXAMPLE 6

100 parts by weight of butadiene-styrene in powder form (70% of butadiene and 30% of styrene), 4 parts by weight of dimethyl siloxane having a viscosity of 500 centistrokes, and 280 parts by weight of dichlorofluoromethane, are placed in an aerosol container. After injection into the boot and evaporation of the solvent, the foam obtained is naturally more flexible than that obtained with polystyrene alone.

It should be noted that in Examples 5 and 6 above, the copolymer need not be pre-expanded before being dissolved.

What is claimed is:

1. A method for adjusting a ski boot including an outer shell, a sole and a slipper located inside said shell and providing at least one cavity between said shell and the foot, comprising: placing the foot to which the boot is to be fitted in the slipper, filling the cavity with a mixture of products solved in at least one volatile product, said mixture being in a stable viscous state; and eliminating the at least one volatile product by causing said volatile product to escape at the atmosphere into a gaseous phase until hardening of the mixture of products.

2. A method according to claim 1, wherein the mixture of viscous products introduced into the cavity consists of:
a binder made from at least one of the following products: an elastomeric product, a plastic product; and
a volatile product.

3. A method according to claim 2, wherein the mixture also contains a filler.

4. A method according to claim 2, wherein the elastomeric product is preferably at least one of the following: a natural rubber, reticulated or not, a butyl, nitrile, or chlorinated rubber, a polyisobutylene, an ethylene/propylene rubber, a styrene-butadiene or styrene-isoprene copolymer, a latex, a polyurethane, a silicone, an isobutylene/isopropylene copolymer, a thiokol, a polystyrene or a polystyrene copolymer.

5. A method according to claim 1, wherein the plastic product is preferably at least one of the following: a polyamide, a polyurethane, an acrylic, a cellulosic, a glycerophthalic, epoxy, or vinyl product.

6. A method according to claim 3, wherein the filler is made up of resiliently compressible materials such as: polyurethane-foam scrap, rubber powder, polyethylene foam, cork powder.

7. A method according to claim 2, wherein the filler is made up of incompressible materials, such as wood dust, carbonate of lime, slate powder, polystyrene balls.

8. A method according to claim 6, wherein the filler is of a grain size ranging between 0.1 and 30 mm.

9. A method according to claim 1, wherein the volatile product is a solvent of the binder.

10. A method according to claim 1, wherein the volatile product is preferably at least one of the following organic solvents: aliphatic, aromatic, ketonic, halogenated, with an ether, ester or alcohol function.

11. A method according to claim 9, wherein the boiling point of the solvent is below 150° C.

12. A method according to claim 1, wherein, when polystyrene or a polystyrene copolymer is used, the solvent used is a solvent capable of passing into a gaseous phase under close-to-normal pressure and/or temperature conditions (760 mm Hg and 20°–25° C.).

13. A method according to claim 12, wherein the polystyrene or copolymer is expanded before being dissolved.

14. A method according to claim 13, wherein the vapor pressure of the solvent is above 0.5 kg/cm$^2$ at 20° C.

15. A method according to claim 14, wherein the solvent is a chlorofluorinated hydrocarbon.

16. A method according to claim 15, wherein the chlorofluorinated hydrocarbon is dichlorofluoromethane.

17. A method according to claim 15, wherein the chlorofluorinated hydrocarbon is trichlorofluoromethane.

18. A method according to claim 12, wherein a surfactant, more particularly a silicone oil, is added to the mixture of polystyrene, or copolymer, and solvent.

19. A method according to claim 1, wherein the mixture is injected under pressure into the cavity located between the foot and the shell.

20. A method according to claim 19, wherein the volatile product is in a liquid state under pressure.

21. A method according to claim 1, wherein the cavity located between the foot and the shell is defined by an envelope porous to the solvents.

22. A method according to claim 1, wherein the mixture is contained in a sealed envelope placed in the boot at the time of manufacture thereof, said envelope being opened, in at least one place, at the time of use, to allow the volatile product to escape.

23. A method according to claim 12, wherein the mixture is held in an aerosol container by means of which it is projected into the cavity, the solvent being subsequently released from said cavity until the product hardens into a foam.

24. A method according to claim 1, wherein the mixture located in the boot is heated to evaporate the solvent.

25. A method according to claim 1, wherein the boot is placed in an enclosure under a vacuum, to assist in evaporating the solvent.

26. A method according to claim 1, wherein the mixture of viscous products comprises, in addition, a nonevaporable solvent intended to keep the mixture relatively plastic after the volatile product has been eliminated.

* * * * *